United States Patent
Hughes

[11] Patent Number: 5,267,749
[45] Date of Patent: Dec. 7, 1993

[54] VEHICULAR TRUCK TRAILER BRAKE APPARATUS

[76] Inventor: Kevin D. Hughes, 337 Roslyn Pl., Minneapolis, Minn. 55419

[21] Appl. No.: 797,376

[22] Filed: Nov. 25, 1991

[51] Int. Cl.$^5$ .............................. B60T 1/14; B60S 9/12
[52] U.S. Cl. ............................. 280/432; 280/766.1; 188/5
[58] Field of Search ................ 280/432, 766.1, 764.1; 188/5, 6

[56] References Cited

U.S. PATENT DOCUMENTS

| | | | |
|---|---|---|---|
| 1,495,916 | 5/1924 | McNames | 188/5 |
| 1,950,261 | 3/1934 | Nemours et al. | 188/5 |
| 2,687,191 | 8/1954 | Shannon | 280/432 |
| 2,695,682 | 11/1954 | Ehlinger | 188/5 |
| 2,974,741 | 3/1961 | Witzmann | 188/5 |
| 3,193,110 | 7/1965 | Bamford | 280/766.1 |
| 4,761,021 | 6/1988 | Lagsdin | 280/764.1 |
| 4,923,597 | 5/1990 | Anderson et al. | 280/766.1 |

*Primary Examiner*—Margaret A. Focarino
*Assistant Examiner*—Peter English
*Attorney, Agent, or Firm*—Leon Gilden

[57] ABSTRACT

A braking assembly mounted to a bottom wall of a truck trailer includes telescoping legs biased exteriorly of tubes, wherein the legs are in a parallel relationship pivotally mounted to opposed distal ends of a brake bar securing a brake pad longitudinally and coextensively thereof, with a medially oriented hydraulically actuated piston mounted to an elongate spring arranged for projecting the brake pad downwardly relative to the truck trailer bottom wall.

3 Claims, 4 Drawing Sheets

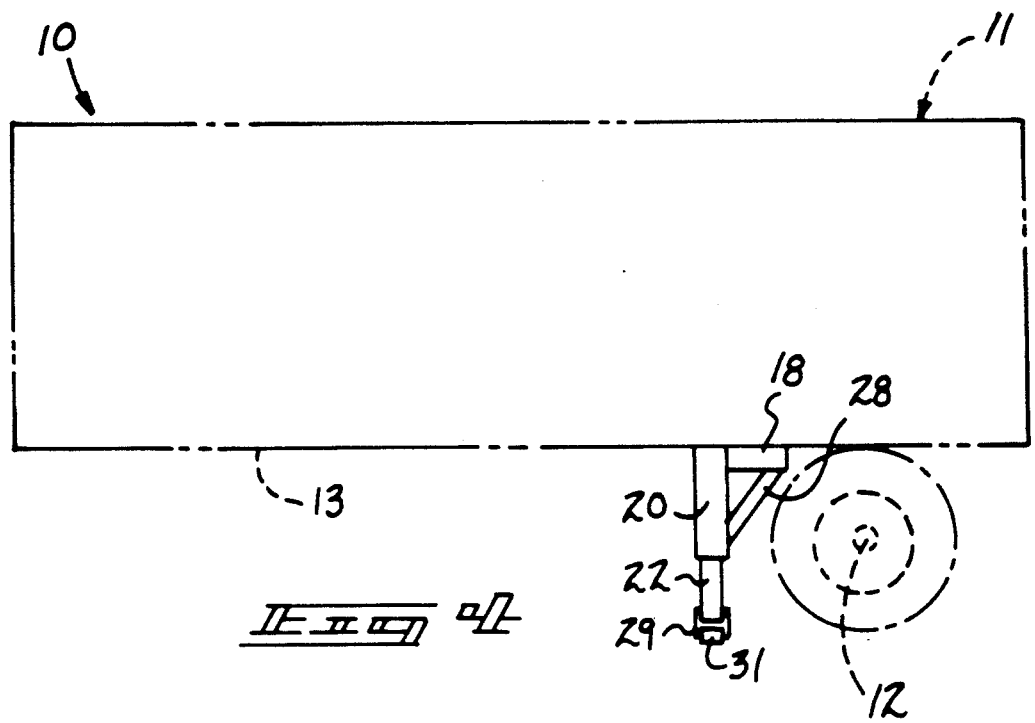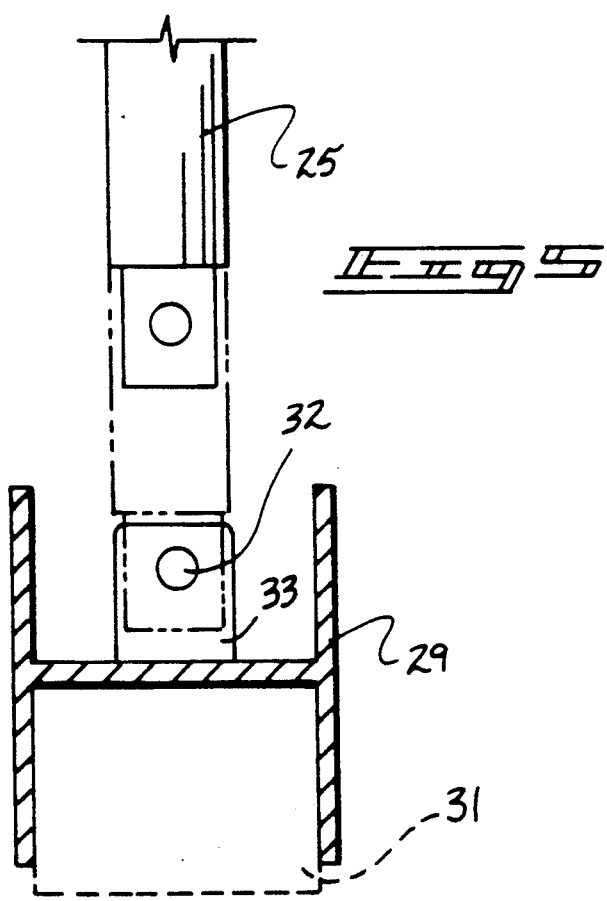

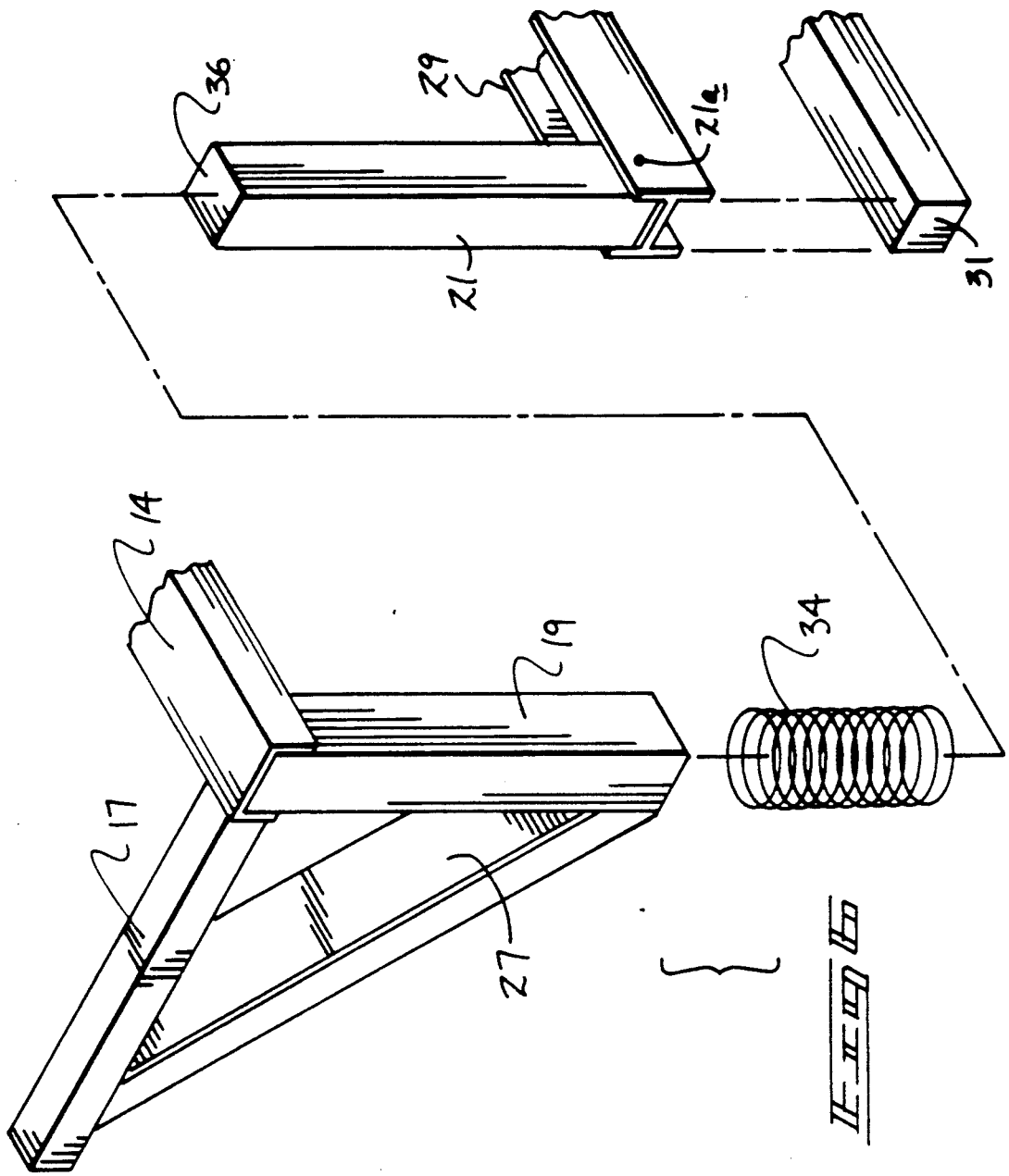

VEHICULAR TRUCK TRAILER BRAKE APPARATUS

BACKGROUND OF THE INVENTION

1. Field of the Invention

The field of invention relates to trailer braking structure, and more particularly pertains to a new and improved vehicular truck trailer brake apparatus wherein the same is arranged to maintain control of a trailer during emergency conditions to minimize loss of control of the associated trailer structure.

2. Description of the Prior Art

Various anti-jack-knifing apparatus and the like is arranged for securement relative to a truck trailer organization and such is exemplified in U.S. Pat. No. 4,790,556 to Hawkins wherein an apparatus is disclosed for limiting angular movement between the trailer and an associated truck organization.

U.S. Pat. No. 4,068,860 to Meyers, et al. sets forth a trailer anti-jack-knifing apparatus to utilize a longitudinal ram arranged for projection medially of a fifth-wheel mounting unit.

U.S. Pat. No. 4,763,953 to Chalin sets forth a trailer stop and stabilizer structure for utilizing an air spring dampening during operation of the trailer.

As such, it may be appreciated that there continues to be a need for a new and improved vehicular truck trailer brake apparatus as set forth by the instant invention which addresses both the problems of ease of use as well as effectiveness in construction to provide for an organization not addressed in the prior art to enhance of control of the trailer during emergency conditions and in this respect, the present invention substantially fulfills this need.

SUMMARY OF THE INVENTION

In view of the foregoing disadvantages inherent in the known types of trailer brake apparatus now present in the prior art, the present invention provides a vehicular truck trailer brake apparatus wherein the same is arranged to utilize a ram member mounted relative to a trailer bottom wall to permit ease of control and braking of the trailer during emergency situations. As such, the general purpose of the present invention, which will be described subsequently in greater detail, is to provide a new and improved vehicular truck trailer brake apparatus which has all the advantages of the prior art trailer brake apparatus and none of the disadvantages.

To attain this, the present invention provides a braking assembly mounted to a bottom wall of a truck trailer, including telescoping legs biased exteriorly of tubes, wherein the legs are in a parallel relationship pivotally mounted to opposed distal ends of a brake bar securing a brake pad longitudinally and coextensively thereof, with a medially oriented hydraulically actuated piston mounted to an elongate spring arranged for projecting the brake pad downwardly relative to the truck trailer bottom wall.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular truck trailer brake apparatus which has all the advantages of the prior art trailer brake apparatus and none of the disadvantages.

It is another object of the present invention to provide a new and improved vehicular truck trailer brake apparatus which may be easily and efficiently manufactured and marketed.

It is a further object of the present invention to provide a new and improved vehicular truck trailer brake apparatus which is of a durable and reliable construction.

An even further object of the present invention is to provide a new and improved vehicular truck trailer brake apparatus which is susceptible of a low cost of manufacture with regard to both materials and labor, and which accordingly is then susceptible of low prices of sale to the consuming public, thereby making such vehicular truck trailer brake apparatus economically available to the buying public.

Still yet another object of the present invention is to provide a new and improved vehicular truck trailer brake apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic side view of the invention mounted to an associated trailer structure.

FIG. 5 is an orthographic view, taken of section 5 as set forth in FIG. 1.

FIG. 5 is an isometric illustration of the organization illustrating the spring-biased telescoping legs utilized by the organization.

FIG. 7 is an orthographic view, taken along the lines 7—7 of FIG. 1, of the brake pad structure of the invention.

DESCRIPTION OF THE PREFERRED EMBODIMENT

Figure 1:
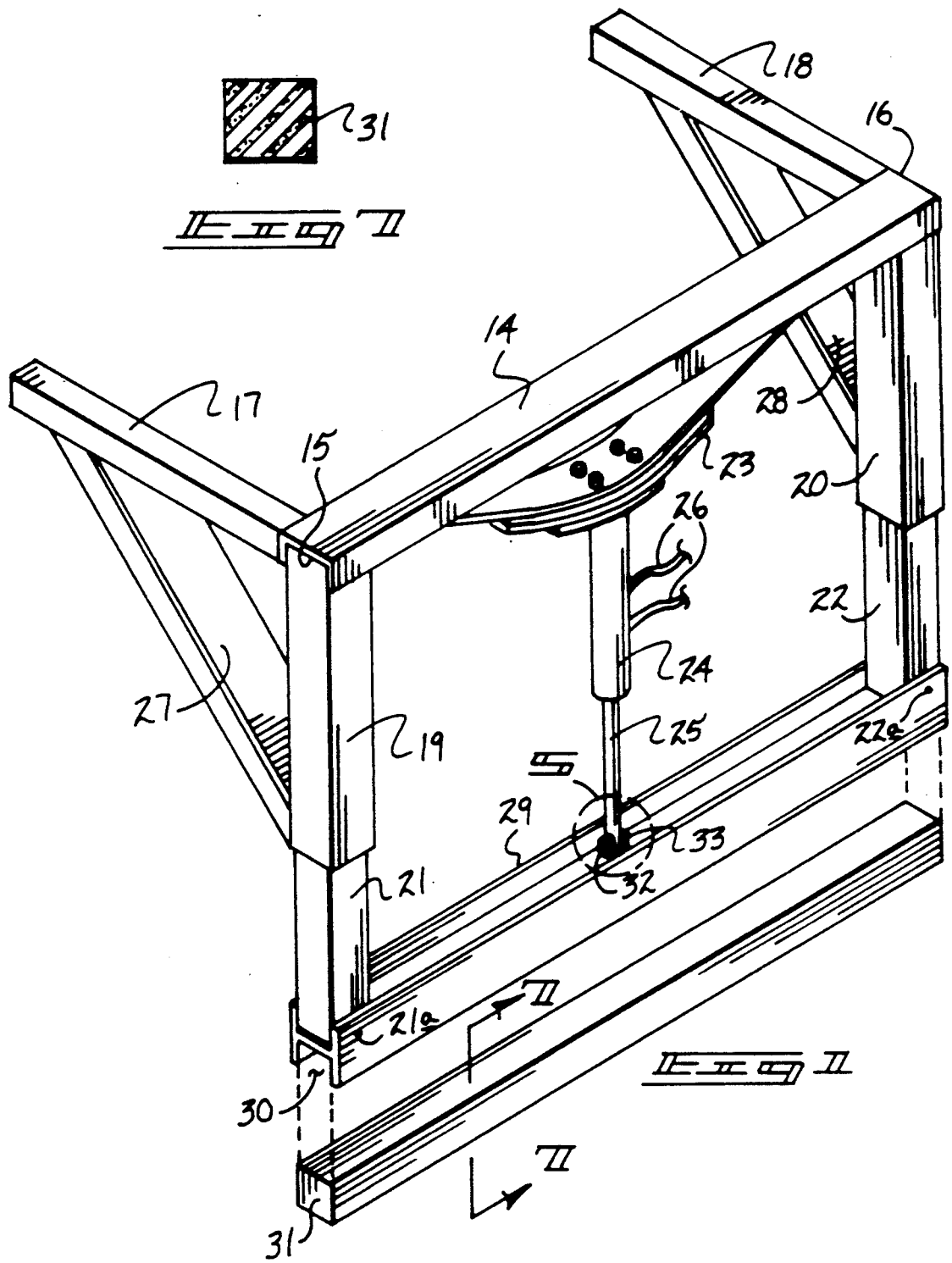
FIG. 1 is an isometric illustration of the instant invention.
Figure 2:
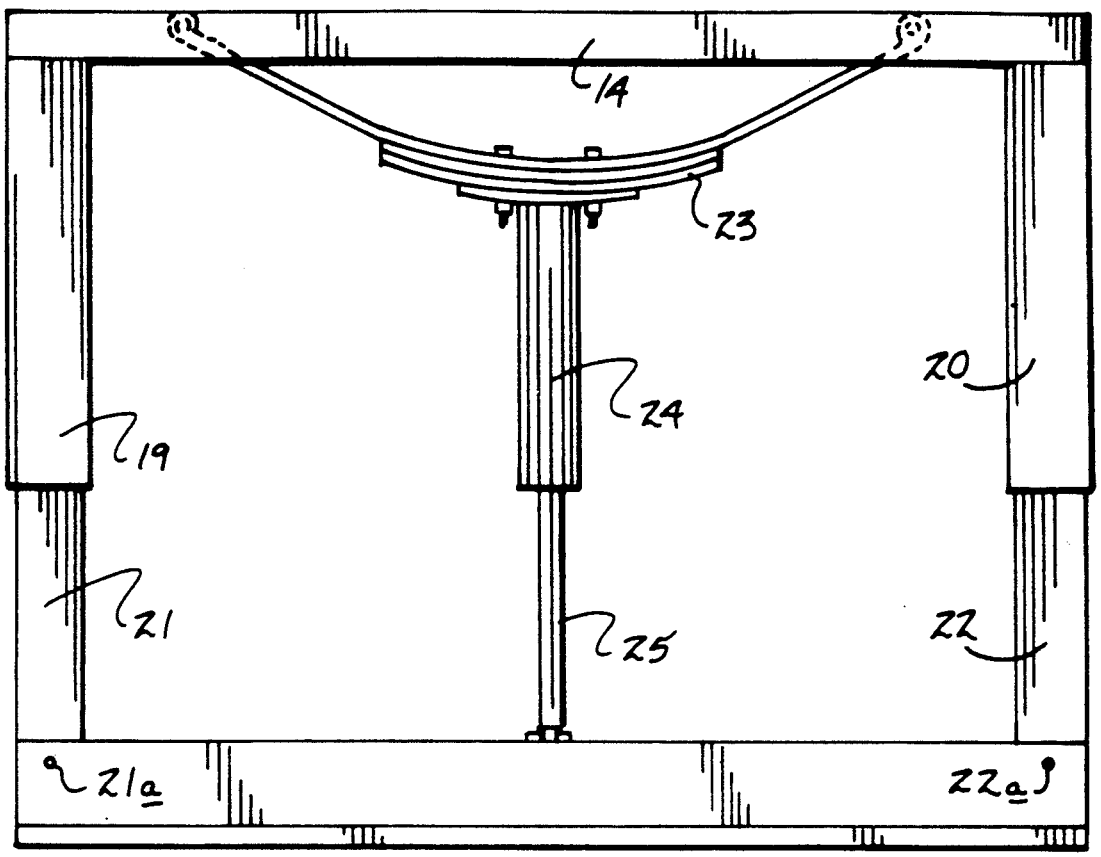
FIG. 2 is an orthographic frontal view, taken in elevation, of the instant invention.
Figure 3:
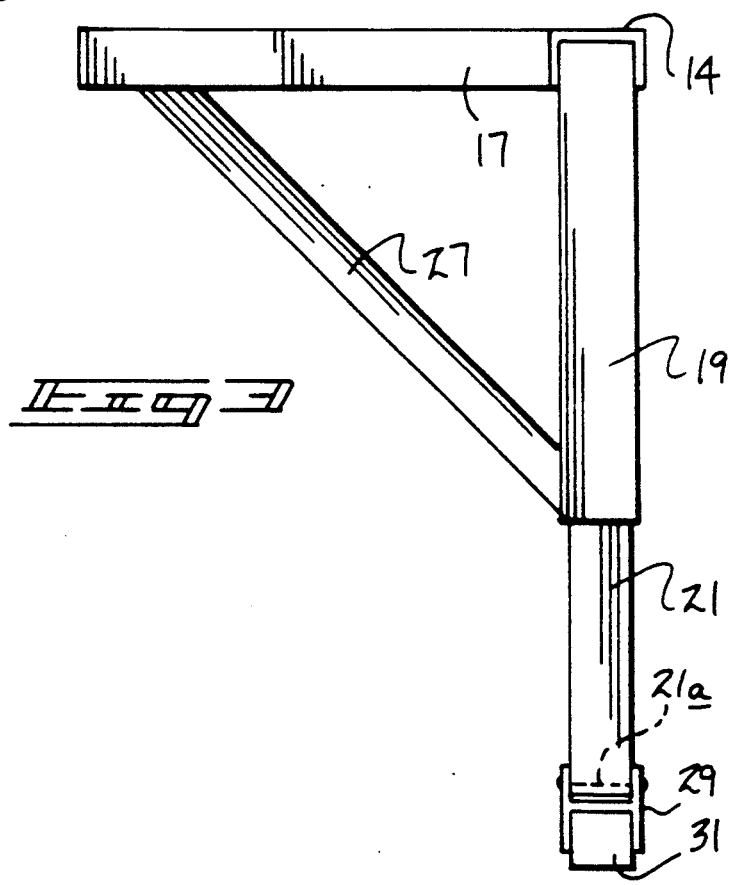
FIG. 3 is an orthographic side view of the instant invention.

With reference now to the drawings, and in particular to FIGS. 1 to 7 thereof, a new and improved vehicular truck trailer brake apparatus embodying the principles and concepts of the present invention and generally designated by the reference numeral 10 will be described.

More specifically, the vehicular truck trailer brake apparatus 10 of the instant invention essentially comprises the organization in combination with a truck trailer 11 that includes a truck trailer rear wheel axle 12 mounting wheels thereto rotatably about the axle, with a truck trailer bottom wall 13 mounting the organization of the braking structure. A top support bar 14 is provided, including a first end 15 spaced from a second end 16. The top support bar 14 is of a longitudinally straight configuration, including a first mounting bar 17 and a second mounting bar 18 mounted orthogonally and rearwardly of the top support bar at the respective first and second ends 15 and 16, with the mounting bars positioned rearwardly to the axle 12. A first support tube 19 and a second support tube 20 are mounted orthogonally and downwardly relative to the top support bar 14 at the first and second ends 15 and 16 and are orthogonally oriented relative to the first and second mounting bars 17 and 18. A first reinforcing bar 27 extends fixedly between a lower distal end of the first support tube 19 canted upwardly and integrally joined to the first mounting bar 17 spaced from the support bar first end 15. Similarly, a second reinforcing bar 28 mounted adjacent a lower distal end of the second support tube 20 is canted rearwardly and upwardly to the second support tube 20 integrally joined to the second mounting bar 18 rearwardly of the support bar second end 16. A respective first and second telescoping leg 21 and 22 are telescopingly and slidingly received within the respective first and second support tubes 19 and 20. Reference to the FIG. 6 illustrates the use of telescoping legs spring 34 captured between a telescoping leg top wall 36 and as exemplified relative to the top of the first telescoping leg 21, wherein a leg spring is captured accordingly between each top wall of each associated telescoping leg 21 and 22 in an identical configuration to bias the telescoping legs 21 and 22 exteriorly of the associated support tubes 19 and 20. In this manner, the legs are biased to an extended orientation to accommodate various road surface conditions. An elongate support spring 23 is mounted between the first and second support tubes 19 and 20 longitudinally of the top support bar 14 and in turn integrally secures an actuator cylinder 24 mounted to the spring 23, wherein the actuator cylinder 24 extends downwardly relative thereto in a parallel relationship between the first and second support tubes 19 and 20. An actuator piston 25 is hydraulically actuated in a conventional manner by associated hydraulic piston conduits 26 to effect selective reciprocation of the piston relative to the cylinder 24. An lower distal end of the piston 25 is pivotally mounted medially to a top surface of an elongate brake bar 29 that extends orthogonally between the first and second telescoping legs 21 and 22, wherein the telescoping legs 21 and 22 include respective first and second telescoping leg pivot axles 21a and 22a pivotally mounting the lower distal ends of the first and second telescoping legs 21 and 22 to adjacent first and second distal ends of the respective brake bar 29. The bottom surface of the brake bar 29 defines a rectilinear channel 30 receiving a resilient brake pad 31 coextensively therewithin as the brake pad 31 extends between the first and second ends coextensively of the channel 30 of the brake bar 29. The lower distal end of the piston 25 includes a piston pivot axle 32 directed through the lower distal end of the piston and received orthogonally relative to a bifurcated receiving bracket 33 as the piston pivot axle 32 is oriented in an orthogonal relationship relative to the piston 25 as the lower distal end of the piston 25 is received medially and between spaced legs of the bifurcated receiving bracket 33.

Understandably, should additional braking force be required to stabilize a swaying or displacement of the associated truck trailer 11, the piston 25 is actuated to project downwardly and exteriorly of the cylinder 24 to direct the brake pad 31 relative to a road surface to thereby stabilize the trailer in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicular truck trailer brake apparatus, comprising, a truck trailer, the truck trailer including a truck trailer bottom wall, the truck trailer bottom wall further including a rear wheel axle mounted to the bottom wall adjacent a rear end portion of the truck trailer bottom wall, and a top support bar mounted to the truck trailer bottom wall forwardly of the rear wheel axle, the top support bar including a top support bar first distal end and a top support bar second distal end, wherein the top support bar is of a longitudinally aligned configuration arranged parallel to the rear wheel axle, and the top support bar first end including a first support tube fixedly and orthogonally mounted to the top support bar and orthogonally oriented relative to the truck trailer bottom wall, and a second support tube mounted to the top support bar second end orthogonally oriented relative to the top support bar and the truck trailer bottom wall, wherein the first support tube and the second support tube are arranged parallel relative to one another, and a first telescoping leg slidably mounted within the first support tube, and a second telescoping leg mounted within the second support tube, wherein the first telescoping leg and the second telescoping leg are arranged in sliding reception within the respective first and second support tubes, and an actuator cylinder mounted to the top support bar between the first support tube and the second support tube, wherein the actuator cylinder includes an actuator piston arranged for selective reciprocation relative to the actuator cylinder, and an elongate brake bar, the brake bar extending orthogonally and between a lower distal end of the first telescoping leg and a lower distal end of the second telescoping leg, and the actuator piston including a lower piston end and the lower piston end pivotally mounted to the brake bar medially of the first telescoping leg and the second telescoping leg, and the brake bar including a brake bar bottom wall, and the brake bar bottom wall extending coextensively of the brake bar, and a brake pad mounted to the brake bar bottom wall, and the lower distal end of the first telescoping leg includes a first pivot axle pivotally mounting the lower distal end of the first telescoping leg to the brake bar, and the second telescoping leg including a second pivot axle, the second pivot axle pivotally mounting the lower distal end of the second telescoping leg to the brake bar, and an elongate support spring mounted longitudinally of the top support bar to a bottom surface thereof, and the actuator cylinder is fixedly mounted to the support spring medially of the support spring projecting downwardly relative to the support spring.

2. An apparatus as set forth in claim 1 wherein the brake bar bottom wall is positioned within a rectilinear channel, and the brake pad is received within the channel and extends exteriorly of the channel for engagement with a road surface.

3. An apparatus as set forth in claim 2 wherein each telescoping leg of said first and second telescoping legs includes a telescoping leg spring captured between an upper distal end of the respective first and second telescoping leg and within the respective first and second support tube.

* * * * *